US012632049B2

(12) United States Patent
Singh et al.

(10) Patent No.: US 12,632,049 B2
(45) Date of Patent: May 19, 2026

(54) AUTONOMOUS MARINE AUTOPILOT SYSTEM

(71) Applicant: Garmin International, Inc., Olathe, KS (US)

(72) Inventors: Ravinder Singh, Olathe, KS (US); Christopher J. Helms, Olathe, KS (US); Michael S. Ellebrecht, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 279 days.

(21) Appl. No.: 18/065,865

(22) Filed: Dec. 14, 2022

(65) Prior Publication Data

US 2023/0195118 A1     Jun. 22, 2023

Related U.S. Application Data

(60) Provisional application No. 63/290,468, filed on Dec. 16, 2021.

(51) Int. Cl.
| | |
|---|---|
| B60L 3/00 | (2019.01) |
| B63H 25/04 | (2006.01) |
| G05D 1/00 | (2006.01) |

(52) U.S. Cl.
CPC ........... G05D 1/0206 (2013.01); B63H 25/04 (2013.01)

(58) Field of Classification Search
CPC .................. G05D 1/0206; B63H 25/04; B63H 2025/045; B63B 79/15; B63B 79/40; B63B 43/18; B63B 49/00; G08G 3/02
See application file for complete search history.

(56) References Cited

U.S. PATENT DOCUMENTS

| | | | |
|---|---|---|---|
| 5,754,429 | A | 5/1998 | Ishihara et al. |
| 7,268,703 | B1 | 9/2007 | Kabel et al. |

(Continued)

FOREIGN PATENT DOCUMENTS

| | | |
|---|---|---|
| CN | 108489497 A | 9/2018 |
| DE | 102007014014 A1 | 9/2008 |

(Continued)

OTHER PUBLICATIONS

Printout from https://my.chevrolet.com/how-to-support/safety/surround-vision, published prior to May 20, 2020.

(Continued)

*Primary Examiner* — Adam M Alharbi
(74) *Attorney, Agent, or Firm* — Samuel M. Korte; Max M. Ali; Kathleen D. Fitterling

(57) ABSTRACT

A marine autopilot system configured to control a marine vessel through a marine environment is disclosed herein. The marine autopilot system may obtain data of the marine environment from charts and community shared data and generate a path from a first location to a destination location in the marine environment. The marine autopilot system may control the marine vessel along the path based on the marine vessel dynamics and weather and water current conditions. Sensors may detect hazards on and in the water and object detections systems may classify the hazards. The marine autopilot system may control the marine vessel to avoid the hazards based on the location and classification of the hazards. Furthermore, sensors may be utilized to generate detailed 3D maps that change with time to dock the marine vessel at known and unknown locations.

12 Claims, 11 Drawing Sheets

(56)     References Cited

U.S. PATENT DOCUMENTS

| | | | |
|---|---|---|---|
| 7,386,392 B1 | 6/2008 | Kabel et al. | |
| 7,865,277 B1* | 1/2011 | Larson | G05D 1/0206 |
| | | | 114/221 A |
| 9,778,657 B2 | 10/2017 | Tyers | |
| 10,281,917 B2 | 5/2019 | Tyers | |
| 2006/0287826 A1 | 12/2006 | Shimizu et al. | |
| 2017/0109891 A1 | 4/2017 | Mosher et al. | |
| 2020/0369351 A1 | 11/2020 | Behrendt et al. | |
| 2020/0401143 A1 | 12/2020 | Johnson et al. | |
| 2021/0019521 A1 | 1/2021 | Park et al. | |
| 2021/0125502 A1* | 4/2021 | Mansor | G05D 1/693 |
| 2021/0166568 A1* | 6/2021 | Kersulec | B63B 43/18 |

FOREIGN PATENT DOCUMENTS

| | | | |
|---|---|---|---|
| JP | 55109975 A | 8/1980 |
| JP | 6236549 B1 | 11/2017 |
| WO | 2018232377 A1 | 12/2018 |

OTHER PUBLICATIONS

Printout from https://www.raymarine.com/assisted-docking/docksense-control.html, published prior to May 20, 2020.

Printout from https://www.raymarine.com/clearcruise.html, published prior to May 20, 2020.

Printout from https://www.raymarine.com/view/blog/news/details/index-id=15032387730.html, published prior to May 20, 2020.

* cited by examiner

Single Camera Setup

Multiple Camera Setup

Multiple Camera + Radar Setup

Multiple Camera + Radar + Lidar Setup

Multiple Camera + Radar + Lidar + AIS/Marine Connections Setup

400

402

Orthographic View

104

404

Perspective View

410

104

20°

408

406

150°

500

600

1100

1102 RECEIVE INPUT FROM USER

1104 OBTAIN ENVIRONMENT DATA

1106 OPTIMIZE PATH

1108 PATH FOLLOWING/HAZARD AVOIDANCE

1110 DESTINATION AND DOCKING

1112 FEEDBACK AND SHUT DOWN

AUTONOMOUS MARINE AUTOPILOT SYSTEM

RELATED APPLICATIONS

This non-provisional patent application claims priority benefit, with regard to all common subject matter, of earlier-filed U.S. Provisional Patent Application No. 63/290,468, filed Dec. 16, 2021, and entitled "AUTONOMOUS MARINE AUTOPILOT SYSTEM." The identified earlier-filed provisional patent application is hereby incorporated by reference in its entirety into the present application.

BACKGROUND

Conventional marine autopilot devices typically calculate a route and attempt to follow the calculated route without any real-time route updating during navigation. Current, typical marine autopilots use destination information as well as map data and chart data to calculate a route. However, external events that might cause the vehicle to move off the calculated path are typically not sensed and compensated for in current marine autopilots.

SUMMARY

Embodiments of the present disclosure provide a first embodiment directed to a marine autopilot system for controlling a marine vessel through a marine environment. The marine autopilot system comprises at least one storage device storing historic data indicative of the marine environment and computer-executable instructions, one or more sensors for obtaining current data indicative of the marine environment and a state of the marine vessel, and at least one processor configured to execute the computer-executable instructions. The computer-executable instructions can be executed to obtain a destination location, calculate a path between a first location of the marine vessel and the destination location, control the marine vessel along the path, obtain the current data indicative of the marine environment by the one or more sensors, wherein the current data comprises a location of a hazard, update a trajectory of the marine vessel based on the location of the hazard, and control the marine vessel along the trajectory.

A second embodiment is directed to a marine autopilot system for controlling a marine vessel through a marine environment. The marine autopilot system comprises at least one storage device storing historic data indicative of the marine environment and computer-executable instructions, one or more sensors for obtaining current data indicative of the marine environment and a state of the marine vessel, and at least one processor configured to execute the computer-executable instructions. The computer-executable instructions can be executed to obtain a destination location, calculate a path between a first location of the marine vessel and the destination location, control the marine vessel along the path, obtain the current data indicative of the marine environment by the one or more sensors, wherein the current data comprises a location of a hazard, and update a trajectory of the marine vessel by controlling speed and direction of the marine vessel based on stored dynamics of the marine vessel and the location of the hazard.

A third embodiment is directed to a marine autopilot system for controlling a marine vessel through a marine environment. The marine autopilot system comprises at least one storage device storing historic data indicative of the marine environment and computer-executable instructions, one or more sensors for obtaining current data indicative of the marine environment and a state of the marine vessel, and at least one processor configured to execute the computer-executable instructions. The computer-executable instructions can be executed to obtain a destination location, calculate a path between a first location of the marine vessel and the destination location, control the marine vessel along the path based on weather data and stored dynamics of the marine vessel, obtain the current data indicative of the marine environment by the one or more sensors, wherein the current data comprises a location of a hazard, and update a trajectory of the marine vessel by controlling speed and direction of the marine vessel based on the location of the hazard and the stored dynamics of the marine vessel.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
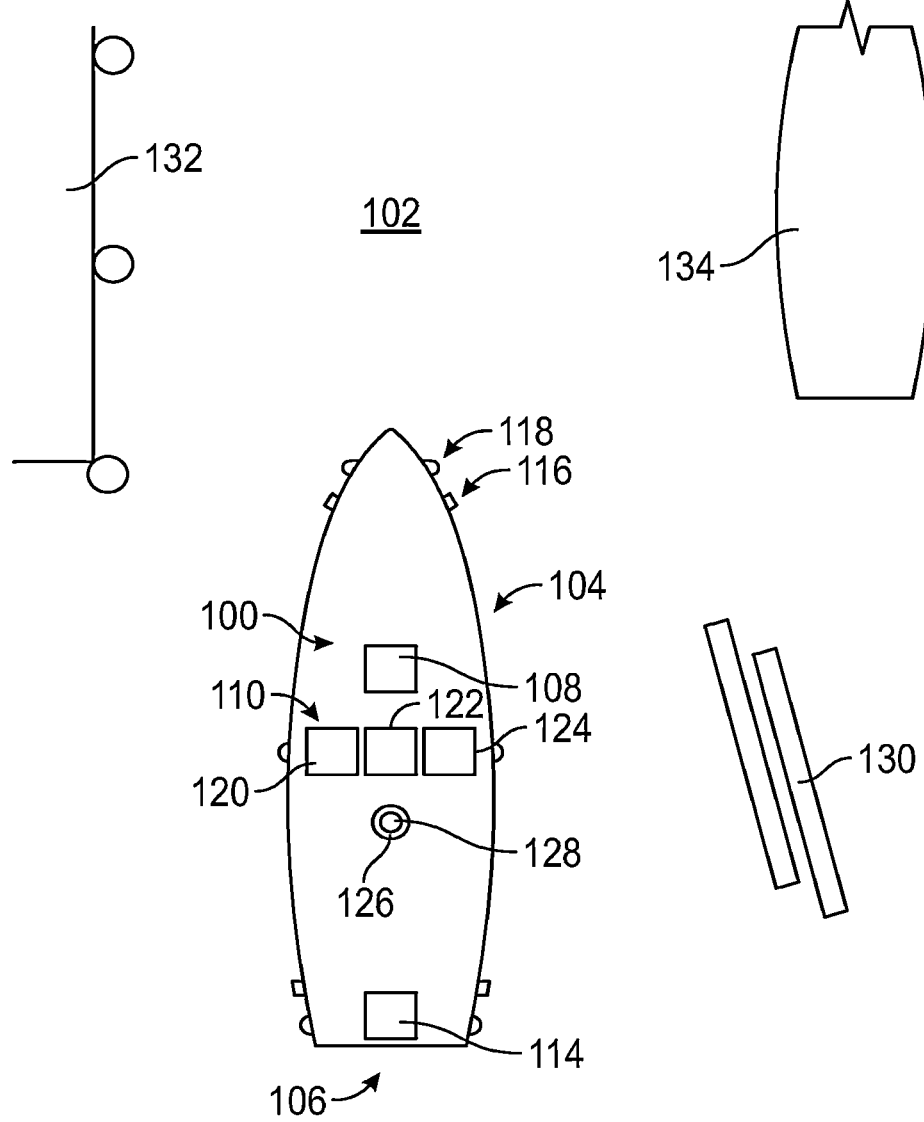
FIG. 1 depicts an exemplary overhead view of a vessel comprising a marine autopilot system and potential hazards.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Generally, embodiments of the disclosure are directed to a marine autopilot system for controlling a vessel through a marine environment. In some embodiments, the marine autopilot system may utilize vessel dynamics and maps and charts of the marine environment to plan a path from a starting point to a destination. Under simple conditions the marine autopilot system may control a real-time trajectory by controlling the speed of the vessel as well as the direction of the vessel to follow the path. The marine autopilot system may utilize data from sensors detecting hazards such as, for example, other vessels, swimmers, buoys, weather conditions, and the like to modify the trajectory of the vessel to provide collision avoidance in real time. The sensors may be combined to detect a four-dimensional (4D) view comprising above water and below water of the marine environment. Furthermore, the various sensor data may be collected and combined to generate a virtual map of the total marine environment comprising all features above and below water, and all moving objects including hazards within a local vicinity of the vessel. When the total virtual map is created a trajectory for the vessel to navigate the marine environment may be generated. Furthermore, the marine autopilot system may compensate for crosswinds and currents to minimize the error between the vessel trajectory and the planned path.

Embodiments facilitate users, especially inexperienced users, maneuvering a vessel under such adverse and otherwise challenging conditions as strong winds or currents, poor lighting, the presence of other boats, ships, or objects, poor fields of vision (especially for larger boats and ships), or poor maneuverability (especially for vessels without thrusters or forward motors). As used herein, "marine" shall refer to substantially any aquatic environment, including so-called "brown" or "blue" water environments, such as rivers, lakes, coastal areas, seas, and oceans.

In some embodiments operating in example marine environments, a vessel may include one or more motors, a control system, and a navigation system. The motors may be configured to drive and maneuver the vessel through the marine environment, and the control system may be configured to facilitate a user controlling the movement and orientation of the vessel, including controlling operation of the motors. The navigation system may be configured to inform the user with regard to operating the control system, including with regard to maneuvering the vessel for docking and to avoid objects in the marine environment.

FIG. 1 depicts one example of a marine system 100 in marine environment 102. Although shown in the figures as a medium-sized boat, vessel 104 may be substantially any boat, ship, or other vehicle configured to travel in, on, or over water, including substantially any suitable size, type, and overall design, and which would benefit from marine system 100. In one implementation of marine system 100 and elements of an example operational marine environment, vessel 104 may include one or more motors 106, control system 108, and navigation system 110. Control system 108 and navigation system 110 may be integrated or provided as discrete components. Control system 108, navigation system 110, and sensors 202 (FIG. 2), are depicted as part of marine autopilot system 200 in FIG. 2.

One or more motors 106 may be configured to drive and maneuver vessel 104 through marine environment 102. In one implementation, one or more motors 106 may include primary motor 114 configured to provide a primary propulsive force for driving vessel 104, especially forwardly, through marine environment 102. In one implementation, primary motor 114 may be mounted to a rear portion (e.g., stern or transom) of vessel 104. Primary motor 114 may be configured with an actuator for rotating primary motor 114 in and out of the water by marine system 100. One or more motors 106 may further include secondary motors 116 configured to provide a secondary propulsive force for steering or otherwise maneuvering vessel 104 through marine environment 102. Secondary motors 116 may be used with primary motor 114 to enhance steering, or without primary motor 114 when maneuvering vessel 104 in situations that require relatively higher precision (e.g., navigating around other boats or other obstacles and/or in relatively shallow water). Secondary motors 116 may be used to steer vessel 104 and/or may be used to maintain vessel 104 at a substantially fixed position and/or orientation in the water. In various implementations, secondary motors 116 may be mounted to any suitable portion of vessel 104 (e.g., at or near a bow, stern, and/or starboard or port side of vessel 104) depending on the natures of secondary motors 116 and vessel 104. One or more motors 106 may employ substantially any suitable technology for accomplishing their stated functions, such as gasoline, diesel, and/or electric technologies. In embodiments, secondary motors 116 are configured as hull thrusters.

Control system 108 may be configured to facilitate a user controlling the movement and orientation of vessel 104. Depending on the design of vessel 104, this may include controlling the amount of thrust provided by and/or the orientation of some or all of one or more motors 106 and/or a position of a rudder or other control surfaces. Control system 108 may employ substantially any suitable technology for accomplishing its stated functions, such as various wired and/or wireless controls. Control system 108 may also comprise, in some embodiments, control system 250 (FIG. 2) as described below.

Navigation system 110 may be configured to inform the user with regard to how to operate control system 108, including with regard to maneuvering vessel 104 for navigating marine environment 102. Navigation system 110 may employ substantially any suitable technology for accomplishing its stated functions, such as various conventional navigational technologies. For example, by way of navigational technologies, navigation system 110 may include one or more sensors for detecting an orientation, change in orientation, direction, change in direction, position, and/or change in position of vessel 104. In some implementations, navigation system 110 may include a location determining component that is configured to detect a position measurement for vessel 104 (e.g., geographic coordinates of at least one reference point on vessel 104, such as a motor location, vessel center, bow location, stern location, etc.). In some implementations, the location determining component may be a global navigation satellite system (GNSS) receiver (e.g., a global positioning system (GPS) receiver, software defined (e.g., multi-protocol) receiver, or the like). In some implementations, navigation system 110 may be configured to receive a position measurement from another device, such as an external location determining component or from at least one of one or more motors 106. Other positioning-determining technologies may include a server in a server-based architecture, a ground-based infrastructure, one or more sensors (e.g., gyros or odometers), a Global Orbiting Navigation Satellite System (GLONASS), a Galileo navigation system, and the like.

In some implementations, navigation system 110 may include a magnetometer or GNSS heading sensor configured to detect an orientation measurement for vessel 104. For example, the magnetometer or GNSS heading sensor may be configured to detect a direction in which the bow of vessel 104 is pointed and/or a heading of vessel 104. In some implementations, navigation system 110 may be configured to receive an orientation measurement from another device, such as an external magnetometer, an external GNSS heading sensor, a location determining device, and/or one or more motors 106. In some implementations, navigation system 110 may include or be communicatively coupled with at least one inertial sensor (e.g., accelerometer and/or gyroscope) for detecting the orientation or change in orientation of vessel 104. For example, an inertial sensor may be used instead of or in addition to the magnetometer or GNSS heading sensor to detect the orientation.

Navigation system 110 may include a processing system communicatively coupled to the location and orientation determining components and configured to receive the position and orientation measurements and to control the integration and other processing and display of this and other navigational information and may perform other functions described herein. The processing system may be implemented in hardware, software, firmware, or a combination thereof, and may include any number of processors, controllers, microprocessors, microcontrollers, programmable logic controllers (PLCs), field-programmable gate arrays (FPGAs), application specific integrated circuits (ASICs), or any other component or components that are operable to perform, or assist in the performance of, the operations described herein. Various features provided by the processing system and, in turn, navigation system 110, may be implemented as software modules that are executable by the processing system to provide desired functionality.

The processing system may also be communicatively coupled to or include electronic memory for storing instructions or data. The memory may be a single component or may be a combination of components that provide the requisite storage functionality. The memory may include various types of volatile or non-volatile memory such as flash memory, optical discs, magnetic storage devices, SRAM, DRAM, or other memory devices capable of storing data and instructions. The processing systems are described in detail below in regard to FIG. 10.

In addition to the foregoing components, navigation system 110 may include, be operationally connected to, or otherwise make use of one or more cameras, such as one or more directional cameras 118 and/or overhead camera 128, computer 120, display device 122, and user interface 124. Each of computer 120, display device 122, and user interface 124 may be integrated within a common housing, such as in embodiments where navigation system 110 is a chartplotter. In other configurations, computer 120, display device 122, and/or user interface 124 may be configured as discrete elements that use wired or wireless communication techniques to interface with various components of marine system 100.

In addition to various navigation technologies such as mapping, routing, weather, radar, sonar, autopilot control, communications, and the like, embodiments of the navigation system may include, be operationally connected to, or otherwise make use of one or more directional cameras 118, overhead camera 128, computer 120, a display device 122, and user interface 124. Each directional camera may be mounted in a particular position on vessel 104 and oriented in a particular direction and configured to generate electronic images of marine environment 102 in the particular direction. Overhead camera 128 may be mounted on a mast or other elevated point on vessel 104 and oriented downward and configured to generate images of vessel 104 and marine environment 102 surrounding the vessel 104. Computer 120 may be configured to receive and process the images from any or all of the one or more directional cameras 118 including overhead camera 128. Computer 120 may transform and stitch together the images from the one or more directional cameras 118 to create a virtual image and/or a virtual overhead image. Display device 122 may be a chartplotter or other electronic display configured to display the processed images, and user interface 124 may be configured to allow the user to provide input regarding operation of some or all the other components of navigation system 110.

In various implementations, navigation system 110 may be configured to provide any one or more of the following features to inform the user. An object identification feature may detect and identify objects in the images and may visually highlight the detected and identified objects in displayed images. A distance marker feature may add markers indicating distance in the displayed images. A collision prediction feature may determine the relative speeds and directions of movement of the objects and vessel 104 and communicate a warning when the relative speed and direction of movement indicates that a particular object and the vessel will collide. An automatic camera selection feature may determine a direction of movement of vessel 104 and automatically display the image generated by one or more directional cameras 118 oriented in the determined direction of movement. A virtual boundary feature may define a virtual boundary and add the virtual boundary to a displayed image at a specified distance around vessel 104 and may determine and communicate a warning when a particular object crosses the virtual boundary. Relatedly, the system may automatically display the image from one or more directional cameras 118 oriented in the direction of the particular object. An image combining feature may combine multiple images from different cameras to create a combined image. A virtual overhead image may be created by transforming and combining multiple images from different cameras. A track display feature may determine a velocity vector and a projected track and may record a track history of the vessel and may add some or all of this information to a displayed image. All overlays (i.e., object highlights, virtual boundaries, distance markers) on individual camera images, combined images and virtual overhead images may be synchronized between the different views to have the same overlays simultaneously shown on a display or multiple displays from different points of view. In some embodiments, navigation system 110 may detect and classify exemplary hazards such as dock 132, ship 134, and breakers 130, and control system 108 may control vessel 104 to avoid the hazards. The object detection, distance markers, virtual boundaries, and navigation and control of vessel 104 is discussed in detail below.

Figure 2:
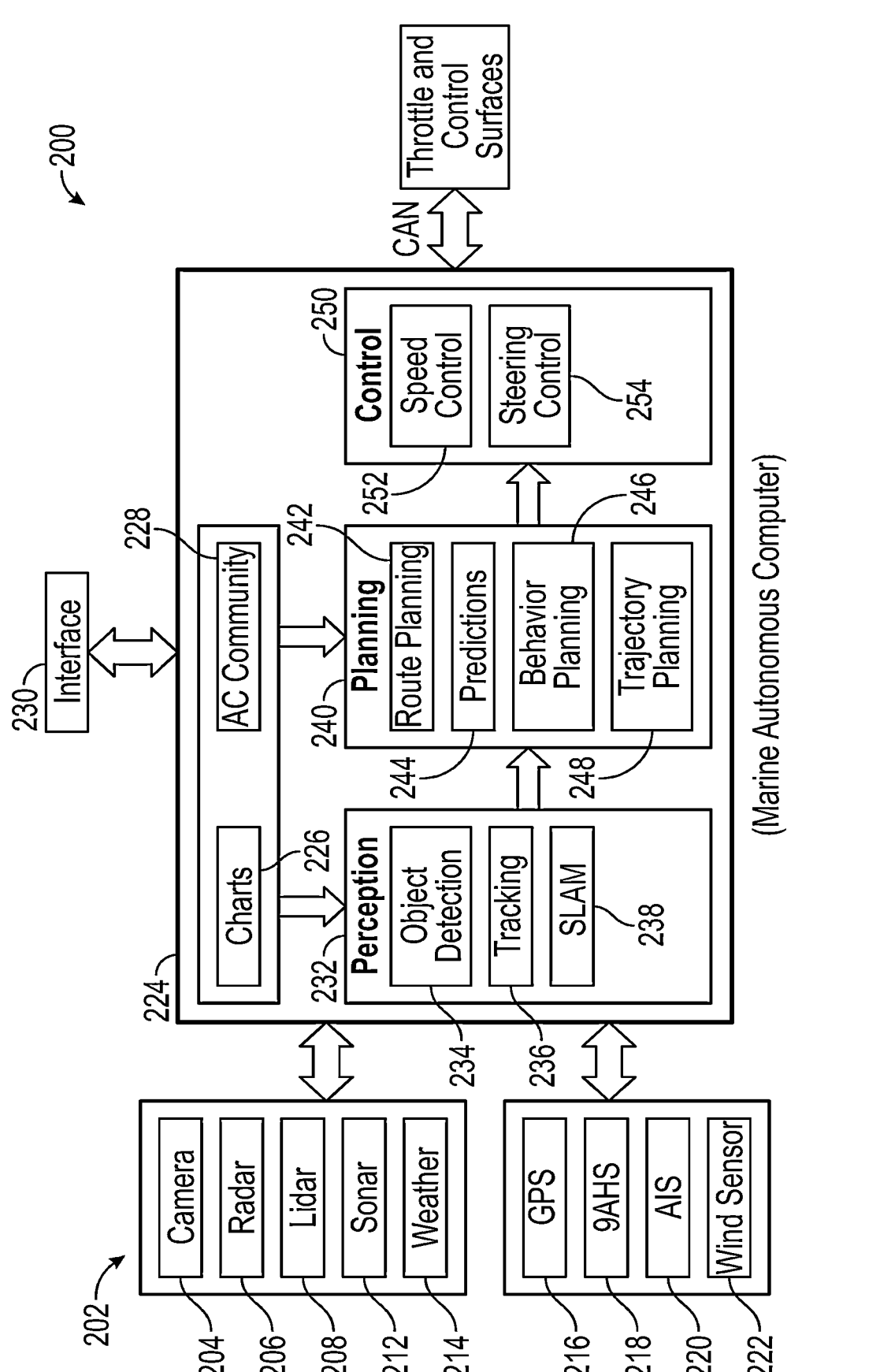
FIG. 2 depicts an exemplary marine autopilot system.

FIG. 2 depicts an exemplary embodiment of marine autopilot system 200. In some embodiments, sensors 202 may obtain data indicative of marine environment 102 and the orientation of vessel 104. Sensors 202 may comprise camera system 204, radar system 206, LIDAR system 208, sonar system 212, wind sensor (e.g., anemometer) 222, GPS 216, inertial maneuvering unit (IMU) 218 (e.g., a 9 degree-of-freedom attitude and heading system (9AHS)), weather detection system 214, as well as, and any other sensor that may be useful in embodiments described herein. Sensor data may be obtained by marine autopilot computer 224, which may be or otherwise comprise computer 120, for navigation and control of vessel 104.

In some embodiments, camera system 204 may comprise the one or more directional camera 118 and may be mounted in a particular position on vessel 104 and oriented in a particular direction and configured to generate electronic images of marine environment 102 in the direction that each of the one or more directional camera 118 is pointing as described above. In some implementations, one or more directional cameras 118 may be sufficient in their number and orientations to provide up to three hundred sixty degrees of image coverage of marine environment 102 around vessel 104. Furthermore, overhead camera 128 may be mounted on a mast or other elevated point 126 on vessel 104 and oriented downward and configured to generate images of vessel 104 and marine environment 102 surrounding vessel 104. One or more directional cameras 118 and overhead cameras 128 may employ substantially any suitable technology to generate image data of substantially any suitable nature, such as optical, radar, LIDAR, and/or infrared. Radar system 206, LIDAR system 208, sonar system 212, and weather detection system 214 are discussed in more detail in embodiments below.

Marine autopilot system 200 may include an image combining feature (module) as part of perception system 232, which may be configured to combine multiple images from sensors 202 to create a single combined image, images, or virtual environment for display. In one implementation, images from several or all of sensors 202 may be stitched together or otherwise combined and transformed to provide a three hundred sixty degree "overhead" view of vessel 104 and its surroundings. In various implementations, the overhead view may be individually displayed, the overhead view may be simultaneously displayed with multiple images from multiple cameras, and/or the overhead view may be selectable for individual or simultaneous display with images from selected cameras. The user may be allowed to enable and disable this feature or any particular aspect or implementation of this feature as desired or needed.

Furthermore, perception system 232 may receive chart data from charts 226. The chart data may comprise geographic features of marine environment 102 for generating navigational plans. Furthermore, perception system 232 comprises tracking system 236 and Simultaneous Localization and Mapping (SLAM) 238 for tracking vessel 104 as well as other objects in marine environment 102 and simulating marine environment 102 with all objects simultaneously.

Marine autopilot system 200 may stitch together all available data to generate a virtual three-dimensional marine environment. The chart data may be used to generate the features of the marine environment 102 such as water depth, GPS locations of buoys, shoreline, docks, and the like. An Automatic Identification System (AIS) transceiver may be used to generate and track locations of other vessels. Sensors 202 may also be used to generate locations and classifications of objects on the water and under the water as described herein. The virtual map may be generated to plan and simulate a path through marine environment 102 by vessel 104.

Marine autopilot system 200 may include tracking system 236 which may be configured to determine a velocity vector and/or a projected trajectory and/or to record a trajectory history of vessel 104 and to add some or all information to a displayed image and/or SLAM. Marine autopilot system 200 may be further configured to similarly display a desired track and may simultaneously display the desired and projected tracks. The user may be allowed to enable and disable visual tracking or any particular aspect or implementation as desired or needed for display.

Interface 230 comprises at least one display, microphone, speakers, and various inputs that the user may interact with to control vessel 104 and interact with marine system 100. Interface 230 may comprise display device 122 and user interface 124. Interface 230 may be communicatively coupled with the computer 120 and may be configured to display the processed images. In various implementations, a single image from a single camera may be individually displayed, multiple images from multiple cameras may be simultaneously displayed, and/or images from selected cameras may be displayed individually or simultaneously. Further, as discussed below, multiple images from different cameras may be combined into a single image and displayed. Display device 122 may employ substantially any suitable technology for accomplishing its stated functions, such as liquid crystal display (LCD), light-emitting diode (LED) display, light-emitting polymer (LEP) display, thin film transistor (TFT) display, gas plasma display, or any other type of display. Display device 122 may be backlit such that it may be viewed in the dark or other low-light environments. Display device 122 may be of any size and/or aspect ratio. In one implementation, display device 122 may include touchscreen technology, such as resistive, capacitive, or infrared touchscreen technologies, or any combination thereof. In one implementation, display device 122 may be a chartplotter which integrates and displays position data with electronic navigational charts. In some embodiments, interface 230 may be user interface 124.

Interface 230 may be configured to allow the user to provide input regarding operation of some or all of the other components of navigation system 110. Interface 230 may employ substantially and suitable technology for accomplishing its stated functions, such as electromechanical input devices (e.g., buttons, switches, toggles, trackballs, and the like), touch-sensitive input devices (e.g., touchpads, touch panels, trackpads, and the like), pressure-sensitive input devices (e.g., force sensors or force-sensitive touchpads, touch panels, trackpads, buttons, switches, toggles, trackballs, and the like), audio input devices (e.g., microphones), cameras (e.g., for detecting user gestures or for face/object recognition), or a combination thereof. In configurations, interface 230 may be integrated with the display, such as in embodiments where the display is configured as a chartplotter and interface 230 is configured to control the operation of the chartplotter through buttons, touch sensors, and/or other controls.

Marine autopilot system 200 further comprises community data 228 providing updated real-time data in marine environment 102. The community data may come directly from a central communication device transmitting location and navigation data for marine environment 102 or may be obtained from each individual vessel within marine environment 102. Community data 228 may comprise the location velocity of vessels in a designated area such as marine environment 102. This data may be obtained in any format readable by marine autopilot system 200 and may be integrated into SLAM 238 to provide a virtual map of marine environment 102.

Planning system 240 may obtain data from interface 230, community data 228, and from perception system 232 to plan paths between locations in marine environment 102. Planning system 240 may comprise route planning module 242. Route planning module 242, in some embodiments, determines an optimized route between the two locations based on the information obtained from interface 230, community data 228, and perception system 232. The determined route may comprise a path from a first location to a second location in marine environment 102. The path may avoid all known obstacles and optimize the path based on time of travel, energy savings, safest route, user comfort, or any combination thereof, or the like. Furthermore, various paths may be provided to the user and the user may select a path. The user may also be given levels of comfort for each path. Marine autopilot system 200 may learn a comfort level for each user based on the paths that each user selects and enjoys the most.

The planned path may be a baseline path that may be adjusted intermittently based on current data comprising updated information from community data 228, sensors 202, weather forecasts, and the like. Specific examples of path planning based on marine environment 102 and hazards is described in detail below.

Predictions module 244 may estimate potential hazards and conditions that may be encountered during the trip. Sensors 202 may detect obstacles such as jet skis, boats, rocks, tree branches, swimmers, buoys, underwater shipwrecks, seaplanes, and the like, in the water. The location and direction of travel of the hazards may be determined and a hazard level may be associated with each object. The location, direction of travel, and hazard level may be stored along with a classification for each hazard. The hazard level and object detection and classification are discussed in more detail below. Various status information for hazards may be ascertained by module 244, such as, for instance, the location, orientation, speed, attitude, type, and duration of a hazard. Module 244 may both identify the current status of various hazards but additionally predict the future status of hazards. For example, for a moving hazard, prediction module 244 may predict the hazard's future path, location, orientation, speed, and the like.

Behavior planning module 246 may estimate potential control of vessel 104 that may be required to navigate the preferred route through the predicted conditions of marine environment 102 based on the dynamic model of vessel 104. Behavior planning module 246 may estimate maneuvers for vessel 104 based on vessel dynamics including vessel capabilities for maneuverability as well as the classification and maneuverability of other objects. Furthermore, standard marine operating procedures may be stored and used to determine path planning and prediction. For example, vessel dynamics may be taken into account when vessel 104 comes into a local area of another vessel. Furthermore, it may be determined that the other vessel has low maneuverability such as a sailboat or a tanker. Therefore, the other vessel may have the right-of-way and vessel 104 may be instructed by marine autopilot system 200 to turn a particular direction to avoid coming too close to the other vessel.

Trajectory planning module 248 may determine the projected trajectory or trajectory segments used to control vessel 104 along or near the predicted path based on the determined obstacles and the behavior planning module output. Continuing with the example above, marine autopilot system 200 may calculate a trajectory to avoid the other vessel and bring vessel 104 back to the designated path after the other vessel has passed. The trajectory may be based on the maneuvering capabilities of vessel 104 and, in some embodiments, of the other vessel. In some configurations, the trajectory planning module 248 may calculate a plurality of trajectories for presentation to the user for selection and/or analysis.

Control system 250 may utilize the output from planning system 240 to control vessel 104 along the trajectory. Control system 250 may completely autonomously control vessel 104 or the user may have some input in a hybrid control system. For example, marine autopilot system 200 may control direction with steering control module 254 while the user controls the throttle, or marine autopilot system 200 may control the throttle with speed control module 252 while the user controls the direction. Either way, planning system 240 may provide the guidance to the controller and the controller may translate the guidance to command the various motors and control surfaces of vessel 104 to follow the path and avoid hazards.

Any linear, nonlinear, and adaptive controllers may be used to control the various control surfaces and throttles to navigate the predicted trajectory. Furthermore, vessel state estimation and estimates of wind dynamics, sea dynamics, and any other external forces may be estimated using state estimation algorithms such as extended Kalman filters and the like.

Figures 3A, 3B, 3C, 3D, 3E:
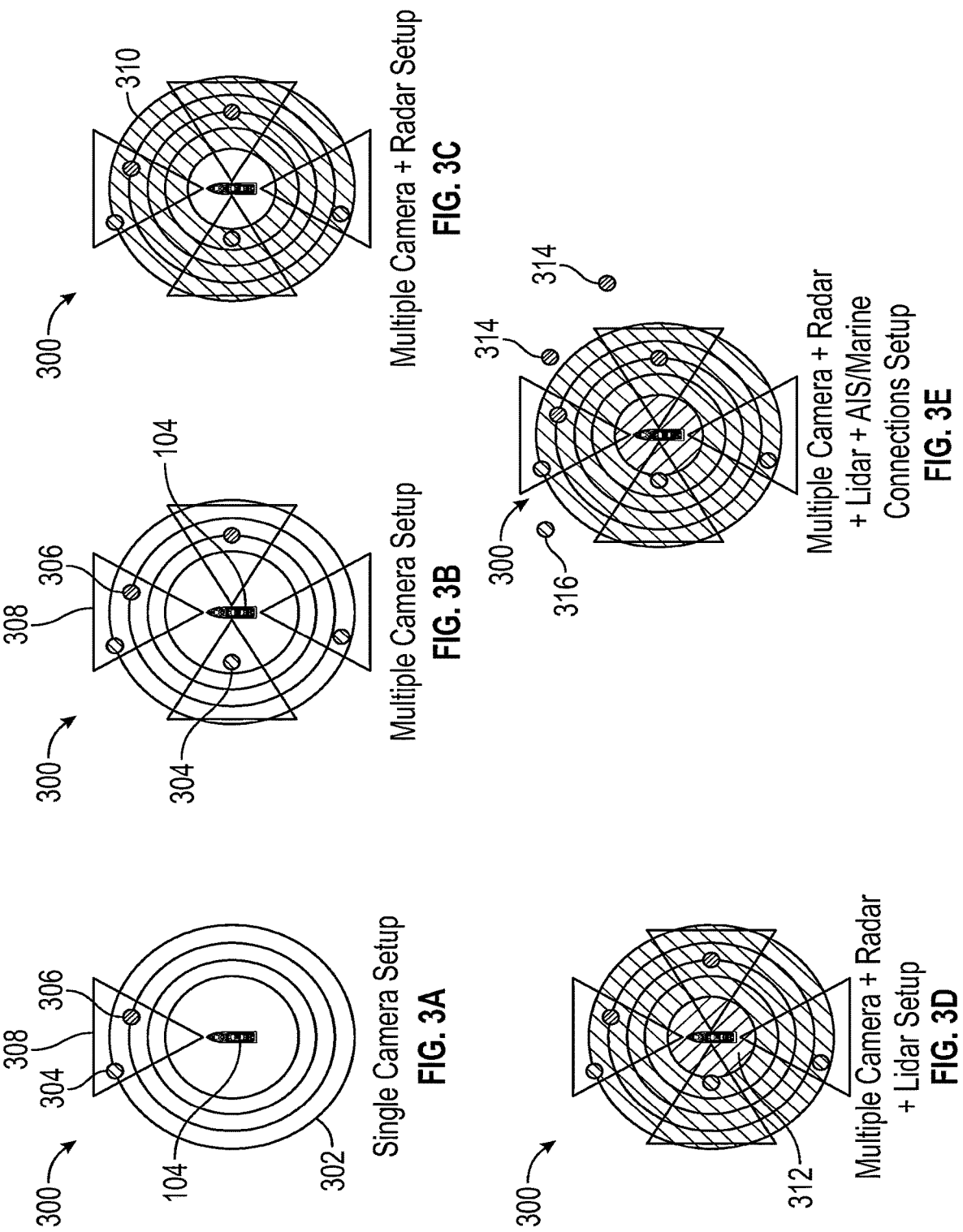
FIGS. 3A-3E depict exemplary sensor arrangements for embodiments of the marine autopilot system.

A variety of sensors 202 may be used to detect objects in marine environment 102. FIGS. 3A-3E depict various levels of environment sensing that may be achieved by some of the variety of sensors 202 associated with marine autopilot system 200 as depicted by the range and sensor icons 300. FIG. 3A depicts vessel 104 with exemplary range markers 302. As depicted, vessel 104 comprises a single camera pointing forward. Camera view 308 illustrates the view from the camera including a green target 304 and a red target 306 (colors depicted by the illustrated texture). The targets may be rocks, swimmers, boats, ice, buoys, tree branches, debris, or any object that may be detected by the camera. The green target 304 may be moving away from vessel 104 and may not be in any danger of collision, which is why the target is green. The red target 306 may be in danger of colliding with vessel 104 and is therefore indicated by the red color. In some embodiments, the camera may face forward or may rotate to various directions automatically or controlled by the user or steering. In some embodiments, a plurality of cameras may view marine environment 102 as depicted in FIG. 3B. As such, full or near full coverage of marine environment 102 may be captured by camera system 204 up to a range given by the quality of cameras used. The images from the plurality of cameras may be stitched together to generate a near full 360° marine environment model.

FIG. 3C depicts camera system 204 combined with radar system 206. Radar system 206 may detect objects a full 360° around vessel 104 as shown by radar texture 310. Furthermore, utilizing radar system 206, may allow detection of smaller objects that may not be quickly detected and classified by camera system 204. Radar system 206 may also detect objects in low visibility when there is fog on the water. When visibility is reduced, the user, and marine autopilot system 200, may rely on radar system 206 to detect hazards that need to be avoided. This provides marine system 100 the ability to operate at night and in low-visibility conditions.

FIG. 3D depicts camera system 204 and radar system 206 combined with LIDAR system 208. LIDAR system 208 may comprise both short- and long-range LIDAR and may image detailed geometry of obstacles within a LIDAR range exemplified by LIDAR range 312. This may be especially useful when navigating close quarters such as in a marina and when docking. Marine autopilot system 200 may navigate vessel 104 to dock in an unknown location based on the detailed geometry obtained by the various sensors. LIDAR system 208 may provide an extremely detailed virtual image of the environment including precise distances between vessel 104 and obstacles such as sides of a dock, that marine autopilot system 200 may dock vessel 104 and/or navigate tight waterways such as, for example, canals in Vienna or Florida.

FIG. 3E depicts camera system 204, radar system 206, LIDAR system 208, combined with AIS connections 220. Communicating with the local marine network further provides location and direction information for boats that may be out of range of detection by sensors 202 onboard vessel 104 as illustrated by outside hazards 314 and outside object 316. Furthermore, communication with the transponders of other ships by AIS connections 220 may provide an additional location sensor for tracking directly by marine autopilot system 200 for simulation of marine environment 102.

Figures 4A, 4B, 4C:
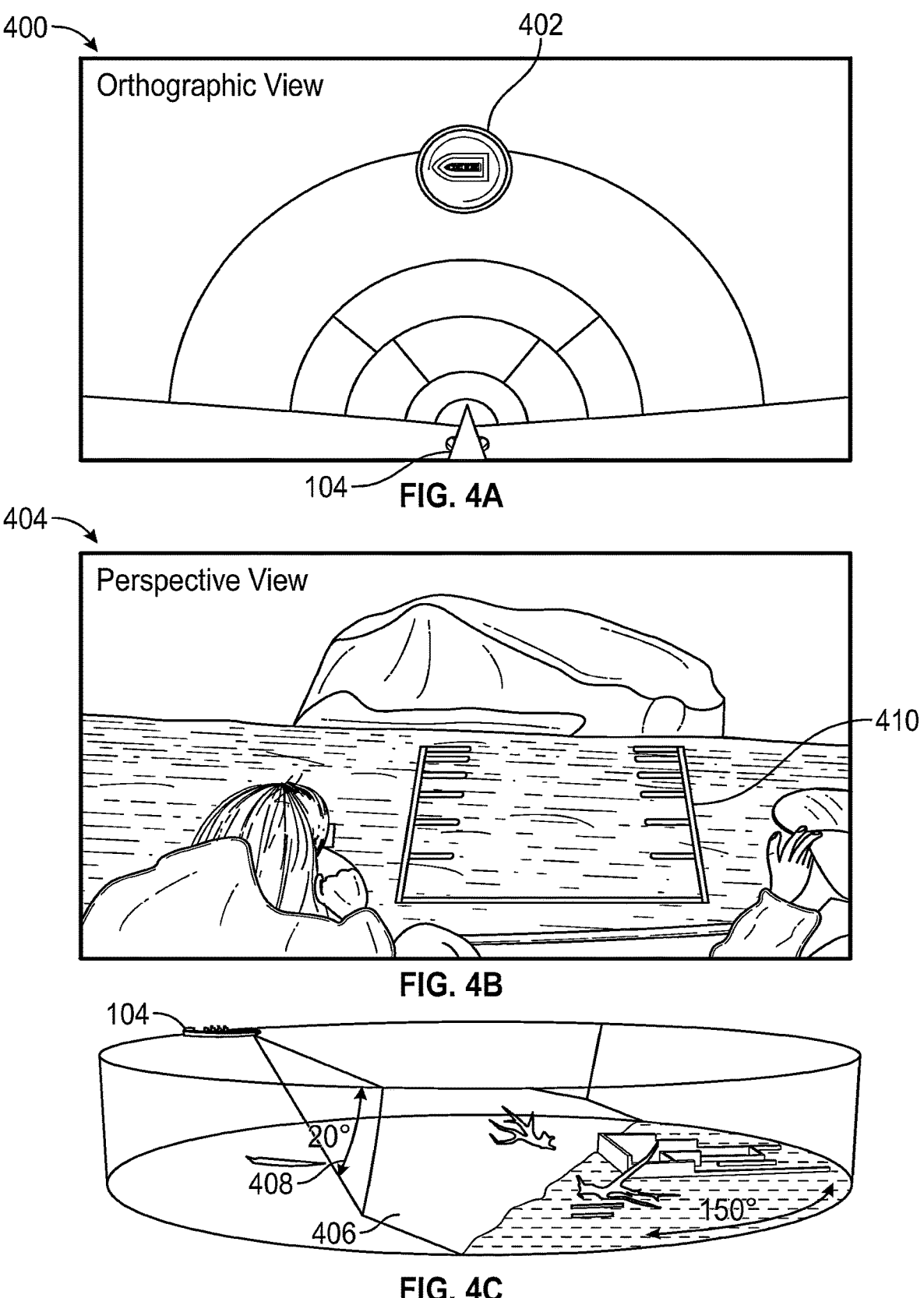
FIGS. 4A-4C depict exemplary above- and below-water views of a marine environment.

FIGS. 4A-4C depict exemplary visualizations provided by camera system 204 and sonar system 212. In some embodiments, sensors 202 may provide information related to obstacles, or objects, on or in the water or air surrounding vessel 104. The objects may have specific geometries that may be detected by sensors 202 such that the objects may be classified by an object recognition system, which may be included in object detection system 234. For example, the object recognition system may comprise neural networks trained on objects expected to be found in marine environment 102. For example, visual object detection and determination may be performed on still images. The objects in the images may be determined by convolution neural networks trained on images of boats, ships, sailboats, jet skis, paddle boarders, swimmers, buoys, and the like. Accordingly, the objects may be classified and stored along with estimated dynamic models of the objects such that maneuverability characteristics of the objects may provide a hazard level determination. The hazard level determination may be indicative of boundaries of a set of objects as discussed in more detail below. Furthermore, the visual characteristics may be combined with any other data detected by sensors 202 to classify the objects. For example, acoustic sensors may provide a sound classification such as boat motors, animal noises, people talking, people or animals swimming, and the like. Comparing the object classification with the sound classification may further provide an increased probability for object detection, classification, and hazard classification.

FIG. 4A depicts one example of an orthographic view 400 that may be generated from data obtained from camera system 204, radar system 206, LIDAR system 208, sonar system 212, AIS connections 220, or any other types of sensors 202 or any other data source. The location, geometry, and velocity of the object may be determined and caused for display. As shown, the object is another boat 402. Other boat 402 may be detected by sensors 202 and the orthographic view 400 may be provided for the user (e.g., boat Captain) to visualize a distance to the other boat 402 as well as motion and time to impact if the other boat is a hazard. Camera system 204 may also be used to show perspective view 404 depicted in FIG. 4B. As shown in FIG. 4B, the object is an iceberg. Perspective view may be a direct live view from a camera of camera system 204 pointed toward the front of vessel 104 or in any direction. Furthermore, sonar system 212 may be used to detect the portion of the iceberg that is underwater.

FIG. 4C depicts an exemplary underwater marine environment 406. Sonar system 212 may detect underwater objects at a specific angle 408 such that objects below, to the sides, and in front of vessel 104 are detected. The sonar data may be collected and analyzed to classify the objects under the water based on characteristic sonar cross sections. The classifications may be automatically annotated for display by a such as display device 122. Furthermore, the sonar data may be indicative of the depth of the water below and in front of vessel 104. As such, vessel 104 may be controlled to slow down and stop when the water depth becomes too shallow.

In various implementations, the navigation system 110 may be configured to provide any one or more of the following features to inform the user with regard to operating the control system 108. Marine autopilot system 200 may include an object identification feature as described above, which may be configured to detect and identify objects in the images. Objects may include any relevant objects or categories of objects such as docks, shores, rocks, buoys, other boats, and debris (e.g., logs). The object identification features may be further configured to detect and identify the water itself (or non-water) in the images in order to better distinguish between the water, non-water, and/or objects in or around the water. In some implementations, marine autopilot system 200 may employ an artificial intelligence module, which may be part of perception system 232, in the form of, e.g., machine learning, computer vision, or neural networks trained with water, non-water objects, and boats in order to learn to reliably identify and distinguish between the objects and the water. In alternative implementations, marine autopilot system 200 may specifically identify individual objects by type or may merely distinguish between objects and water. In some embodiments, in which the object is a dock (FIG. 9), the object recognition feature may include providing a detailed docking view for the user. In such configurations, the marine autopilot system 200 may be calibrated along the dock of interest detailing the sides and the end of the dock.

Marine autopilot system 200 may be further configured to visually highlight the objects (FIG. 10) in displayed images to facilitate awareness by the user. For example, water may be highlighted bright blue or another color, non-water may be highlighted another color, and/or non-water objects may be highlighted yellow or another color. In some implementations, the user may be allowed to select the highlight colors, what objects are highlighted, whether and how water and non-water are highlighted, and how objects are highlighted. Object detection and highlighting may be performed on a pixel-by-pixel basis to allow clear differentiation between objects and water. In some embodiments, the display device 122 may display a first particular image, for example a virtual overhead image generated by combining images from one or more directional cameras 118, in which objects and water may be highlighted, and may simultaneously display a second particular image from a user-selected or automatically selected camera of one or more directional cameras 118 in which objects and/or water may or may not be highlighted. The user may be allowed to enable and disable this feature or any particular aspect or implementation of this feature as desired or needed.

As mentioned, in some implementations, data from an image may be processed using an artificial intelligence computer vision module to identify one or more objects in the image, vessel 104 itself, and the water. The computer vision technology may include a machine learning model, such as a neural network, trained to perform object detection and/or image segmentation to identify the location of one or more objects in the image data received from the one or more cameras from camera system 204. Object detection may involve generating bounding boxes around objects. Image segmentation may provide greater granularity by dividing the image into segments, with each segment containing pixels that have similar attributes. In semantic segmentation every pixel is assigned to a class, and every pixel of the same class is represented as a single instance with a single color, while in instance segmentation different objects of the same class are represented as different instances with different colors.

One example technique for segmenting different objects is to use region-based segmentation in which pixels falling above or below a threshold are classified differently. With a global threshold, the image is divided into object and background by a single threshold value, while with a local threshold, the image is divided into multiple objects and background by multiple thresholds. Another example technique is to use edge detection segmentation which uses the discontinuous local features in any image to detect edges and thereby define the boundary of the object. Another example technique is to use cluster-based segmentation in which the pixels of the image are divided into homogeneous clusters. Another example technique, referred to as Mask region-based convolutional neural network (R-CNN), provides a class, bounding box coordinates, and a mask for each object in the image. These or other techniques, or combinations thereof, may be used by marine autopilot system 200 to identify objects in the images. Such a configuration allows marine autopilot system 200 to be trained to identify desired object types and provide specific feedback for each identified object type. In embodiments, the user of marine autopilot system 200 may identify and label objects displayed on display device 122 using interface 230 to update or retrain the computer vision module. For example, if marine autopilot system 200 is not trained to identify an object that the user commonly encounters, the user may retrain marine autopilot system 200 to automatically identify the object in the future by highlighting the object using interface 230.

Furthermore, marine autopilot system 200 may include a collision prediction feature as part of predictions module 244, which may be configured to determine relative speeds and directions of movement of other vessels or other objects and vessel 104. Further, warnings may be communicated when the relative speed and direction of movement indicates that a particular object (e.g., iceberg FIG. 4B, or other vessel FIG. 4A) and vessel 104 will collide. Relatedly, the marine autopilot system 200 may be configured to automatically display the image from one or more directional cameras 118 oriented in the direction of the particular object. In one implementation, a pop-up bug may appear in a portion of a displayed image related to the threat (FIG. 7C). The pop-up bug may be selectable by the user to cause to be displayed additional information about the object (e.g., identification, direction, velocity). The user may be allowed to enable and disable the pop-up bug feature or any particular aspect or implementation of this feature as desired or needed.

The marine autopilot system 200 may include an automatic camera selection feature (module) as part of camera system 204 which may be configured to automatically select and display one or more images generated by one or more directional cameras 118 which are particularly relevant based on, e.g., the vessel's drive status or input or other considerations. For example, the marine autopilot system 200 may be configured to determine an orientation and/or a direction of movement of vessel 104 and automatically display the image generated by one or more directional cameras 118 oriented in the determined direction of movement. In another example, movement rearward or aft may cause the marine autopilot system 200 to automatically display an image generated by one or more directional cameras 118 oriented rearward. The direction of movement may be determined using, e.g., GPS, IMU, or other position- or motion-sensing technologies which may be part of navigation system 110. The user may be allowed to enable and disable this feature or any particular aspect or implementation of this feature as desired or needed. In some configurations, computer 120 may detect objects and/or other features in images from any particular camera and alert the marine autopilot system 200 to automatically display images from the particular camera based on detected objects. For example, if the user is viewing images from a first camera on display device 122, an object is detected on a second camera not currently being viewed by the user, the marine autopilot system 200 may transition to display of the second camera feed to ensure that the user is aware of the detected object.

Any sensors 202 may obtain data indicative of objects in marine environment 102. The sensor data may be analyzed by any algorithms to compare to known, geometries, sounds, and environmental effects from the objects to classify and display the objects as described above. The sensor data and the object classifications may be stored and simulated in SLAM 238. Therefore, any data collected by sensors 202 may be used to simulate marine environment 102 and for planning system 240 and control system 250.

Continuing with FIG. 4B (also shown in FIG. 10), marine autopilot system 200 may include a distance marker feature (module) which may be configured to overlay onto (or otherwise incorporate into displayed images) distance markers 410 providing scale and indicating distance to facilitate the user determining distances to objects. Lines and/or tick marks may communicate the dimensions and distances from vessel 104 of other docks, other vessels, and other objects. The lines and/or tick marks may represent dimensions and distances of approximately between one meter and five meters in increments of one meter. In some implementations, the display device 122 may display a first particular image from overhead camera 128, and/or a virtual overhead image generated by combining or otherwise stitching together images from camera system 204, in which the distance markers 410 are added, and may simultaneously display a second particular image from a user-selected or automatically selected camera of one or more directional cameras 118 in which the distance markers 410 may or may not be added. The user may be allowed to enable and disable this feature or any particular aspect or implementation of this feature as desired or needed.

Figure 5:
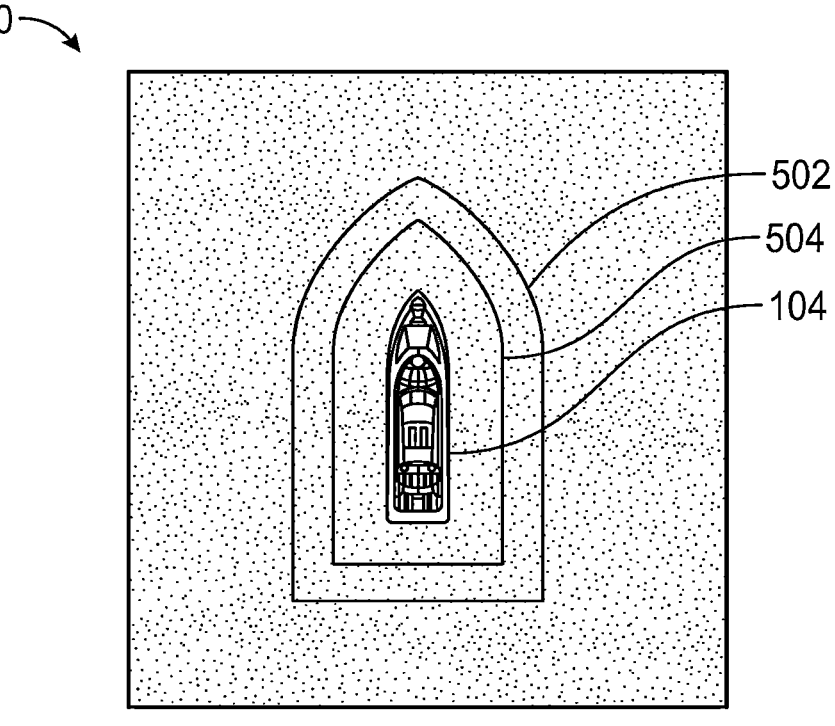
FIG. 5 depicts an exemplary overhead view of the vessel with virtual boundaries.

FIG. 5 depicts one example of a virtual boundary 502 around vessel 104 in overhead view 500. Marine autopilot system 200 may include a virtual boundary module, which may be included with perception system 232 and planning system 240. Virtual boundary module may be configured to define virtual boundary 502 and overlay or otherwise incorporate virtual boundary 502 into a displayed image at a specified distance around vessel 104. Furthermore, marine autopilot system 200 may be further configured to determine and communicate a warning when an object crosses virtual boundary 502. Accordingly, marine autopilot system 200 may be configured to automatically display the image from the direction from camera system 204 oriented in the direction of the object.

In some implementations, as shown in FIG. 5, marine system 100 may be further configured to determine and display a second or more set of one or more boundaries, which are located at various distances from vessel 104 (e.g., virtual boundary 502 and inner boundary 504). Distances between vessel 104 and each boundary may be adjustable by the user or determined based on the type and maneuverability of vessel 104. In some implementations in which there are at least two sets of boundaries, one or more of the boundaries may be configured to ignore object detection, while one or more of the boundaries may be configured to respond to object detection. In some implementations, each boundary may provide passive visual indicators of distances to various objects. In other implementations, each boundary may actively change color entirely or locally to indicate an object breaking or nearing the boundary. For example, virtual boundary 502 may turn yellow when an object crosses and inner boundary 504 may turn red when an object crosses. In yet other implementations, the marine system 100 may be configured to automatically communicate a visual and/or audible warning or other alert to the user when an object breaks a boundary, and, possibly, the size of, classification of the object (e.g., trash, log, rock, animal), and/or distance to the object.

The user may be allowed to enable and disable the boundary feature or any particular aspect or implementation of the boundary feature as desired or needed. In some implementations, if the user has not enabled the boundary feature, marine system 100 may be configured to automatically enable the boundary feature when marine autopilot system 200 detects an object at or within a user-specified distance from vessel 104.

In some embodiments, virtual boundary 502 is automatically enabled and defined by the type and maneuverability of vessel 104 and type and maneuverability of a detected object. For example, vessel 104 may be a large cruise ship or a freight liner that is not capable of quick maneuvers. As such, virtual boundary 502 may be at a distance that allows vessel 104 to easily identify the object and maneuver before collision with the object. Furthermore, the object may be a second vessel. The distance to virtual boundary 502 may be adjusted based on the classification of the second vessel and the stored indicator of maneuverability of the second vessel. For example, the second vessel may be a sailboat and may not be very maneuverable, as such the distance between vessel 104 and virtual boundary 502 may be relatively large. Furthermore, a sailboat virtual boundary may be added to the sailboat image to decrease the allowable range between vessel 104 and the sailboat. When virtual boundary 502 crosses the sailboat virtual boundary, the user is notified and marine autopilot system 200 may command object avoidance.

Figure 6:
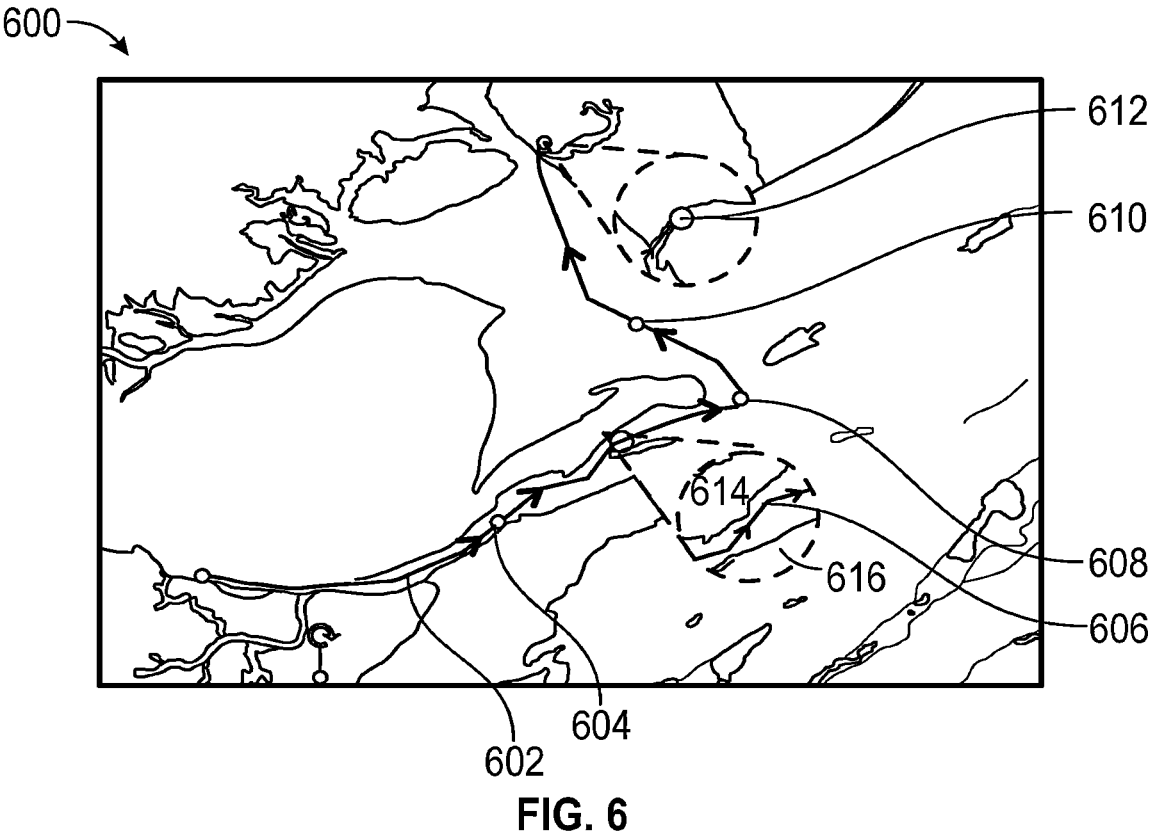
FIG. 6 depicts an exemplary map illustrating navigational steps for the marine autopilot system.

FIG. 6 depicts an exemplary map 600 displaying path 602 showing various locations for adjusted planning based on geometry and marine rules. In some embodiments, at step 604, vessel 104 may be in a speed limit zone. Marine autopilot system 200 may recognize buoys with speed limit signs and control vessel 104 to maintain the speed limit. Furthermore, in some embodiments, there may be proximity sensors detecting speed limit data transmitted by short range transmitters. In some embodiments, geofences may be established and detectable by marine autopilot system 200. In some embodiments, speed limits may be charted such that when vessel 104 is within a designated area, marine autopilot system 200 determines the speed limit from the marine charts and controls vessel 104 to maintain the designated speed limit associated with the area.

At step 606, marine autopilot system 200 may detect tight quarters by sensors 202. As shown, path 602 for vessel 104 may travel a narrow corridor between shore 614 and a small island 616. Similarly, the tight quarters may be charted so that marine autopilot system 200 may be aware of the potential for danger and reduce the speed of vessel 104. Marine autopilot system 200 may control the speed and direction of vessel 104 based on the tight quarters. Marine autopilot system 200 may slow vessel 104 to navigate the tight quarters based on the maneuverability of vessel 104. For example, vessel 104 may be a larger vessel such as a cruise ship navigating a port. Marine autopilot system 200 may reduce the speed of the cruise ship such that the cruise ship may easily maneuver through the port to open seas. The cruise ship may be driven by the captain or by marine autopilot system 200.

At step 608, vessel 104 navigates a sharp turn. As path 602 is known, marine autopilot system 200 may plan a trajectory including speed to navigate path 602. Marine autopilot system 200 may slow the speed of vessel 104 by controlling the throttle in anticipation of the turn. A distance prior to the turn may be set to slow the speed based on the sharpness of the turn. In some embodiments, the speed reduction and the distance prior to the turn may be calculated based on and proportional to the cruise speed of vessel 104 and/or the angle of the turn. Turn dynamics are discussed in detail below in relation to FIGS. 7A-7C.

At step 610, marine autopilot system 200 may adapt the speed of vessel 104 based on the weather conditions. The speed and direction of vessel 104 may be automatically adapted to the wind direction and current. Motors, such as secondary motors 116 may be controlled to compensate for the current and wind, while on sailboats instructions for tack/jibes may be displayed for the user or automatically operated by marine autopilot system 200. These concepts are discussed in more detail below and displayed in FIG. 9.

At step 612, marine autopilot system 200 may change the speed and direction of vessel 104 to navigate the many obstacles that may be present at a destination. As vessel 104 approaches the destination environment, which in this embodiment is a busy marina, vessel 104 may slow to maneuver the various narrow surroundings and the various objects that may be in path 602 or close to path 602 planned by marine autopilot system 200. Charts and maps may be used to determine navigation of the stationary obstacles such as piers, breakers, docks, and the like. In some embodiments, LIDAR system 208 may be used to scan the docks and identify an empty dock where vessel 104 may stop. Furthermore, a detailed map of the dock may be made and continually updated so that marine autopilot system 200 may control vessel 104 into the dock. Furthermore, sonar system 212 may be used to determine the underwater depth at the dock to determine that there is enough depth for vessel 104. A detailed destination environment is discussed below and illustrated in FIG. 8.

Figure 7A:
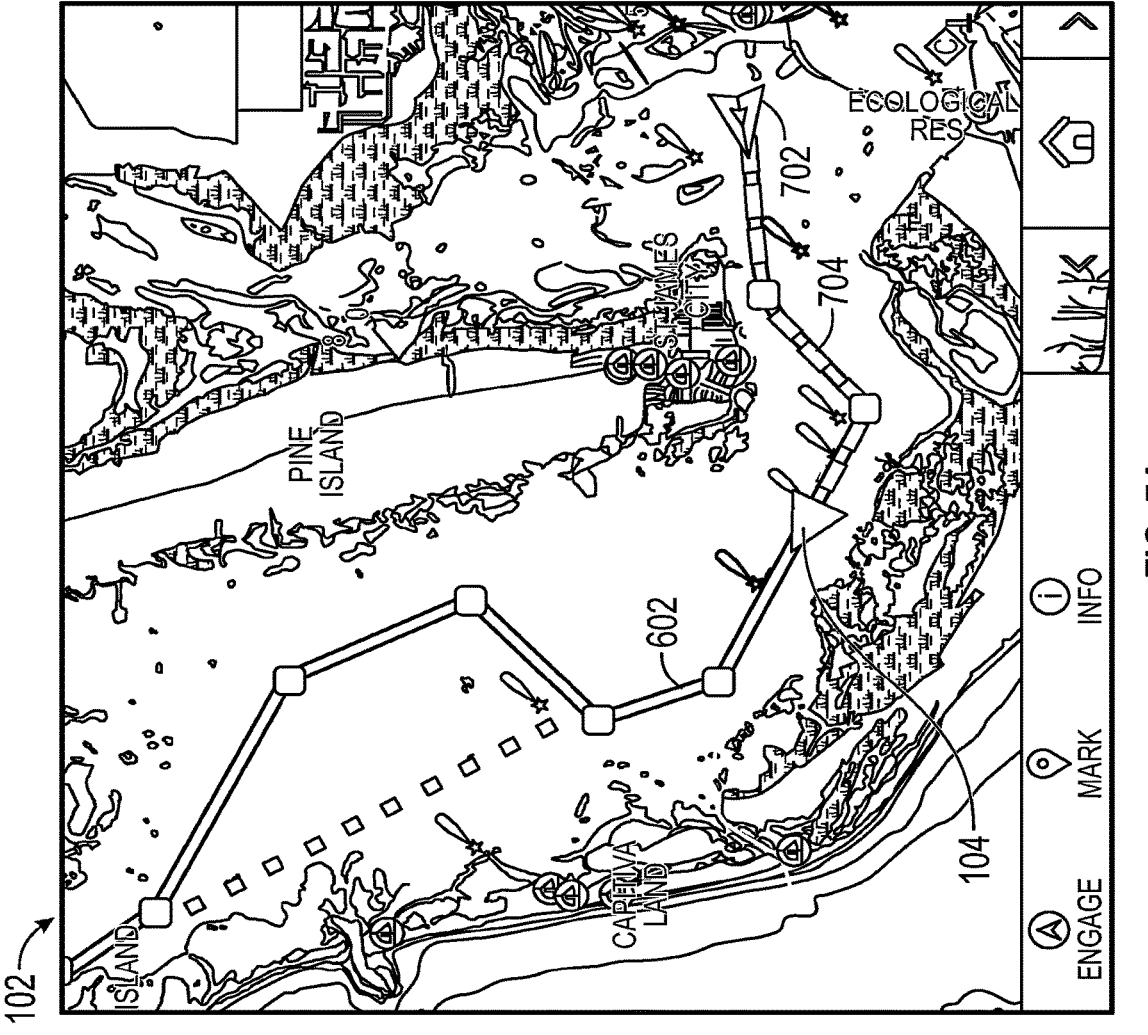
FIGS. 7A-7C depict exemplary speed adjustments for path following.
Figure 7B:
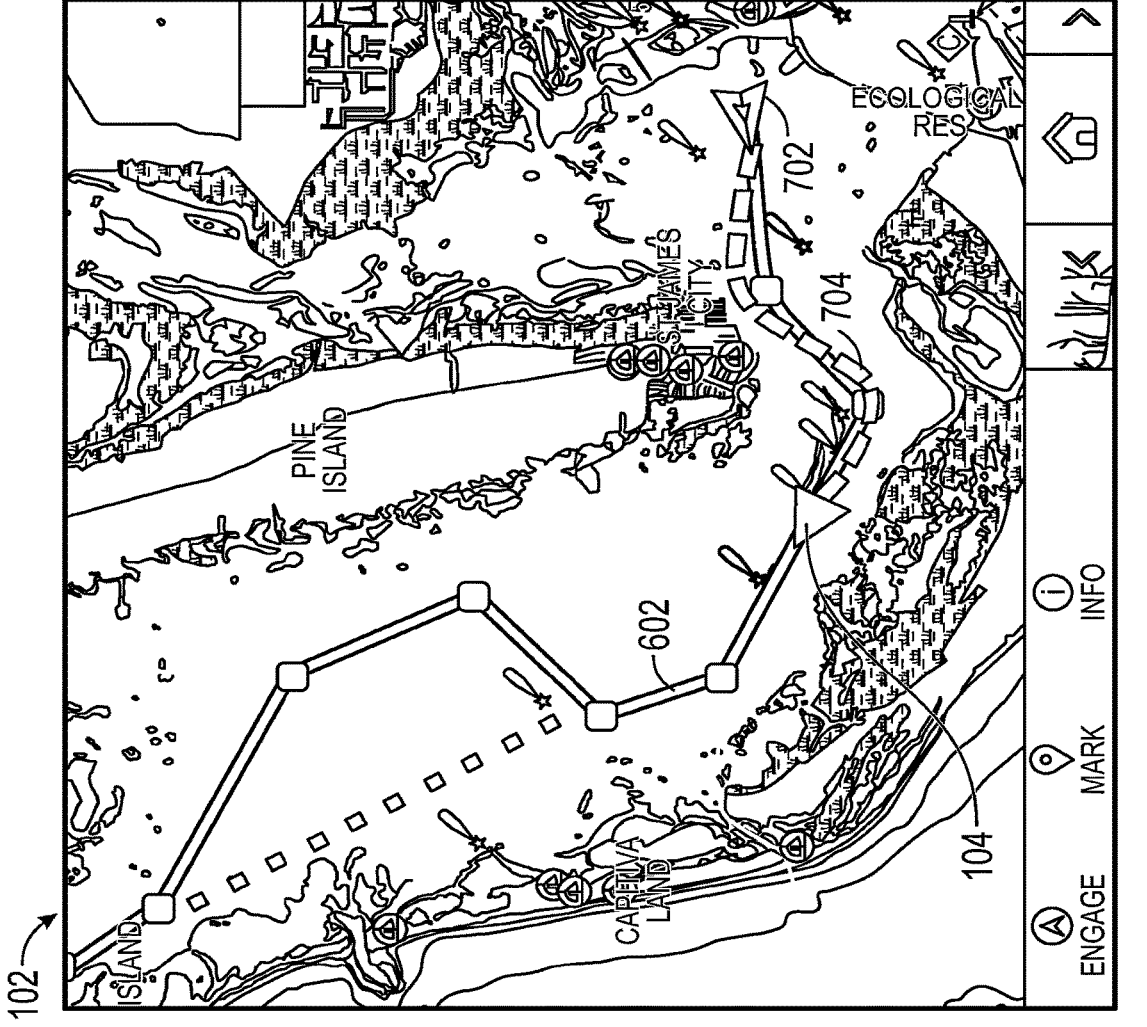
Figure 7C:
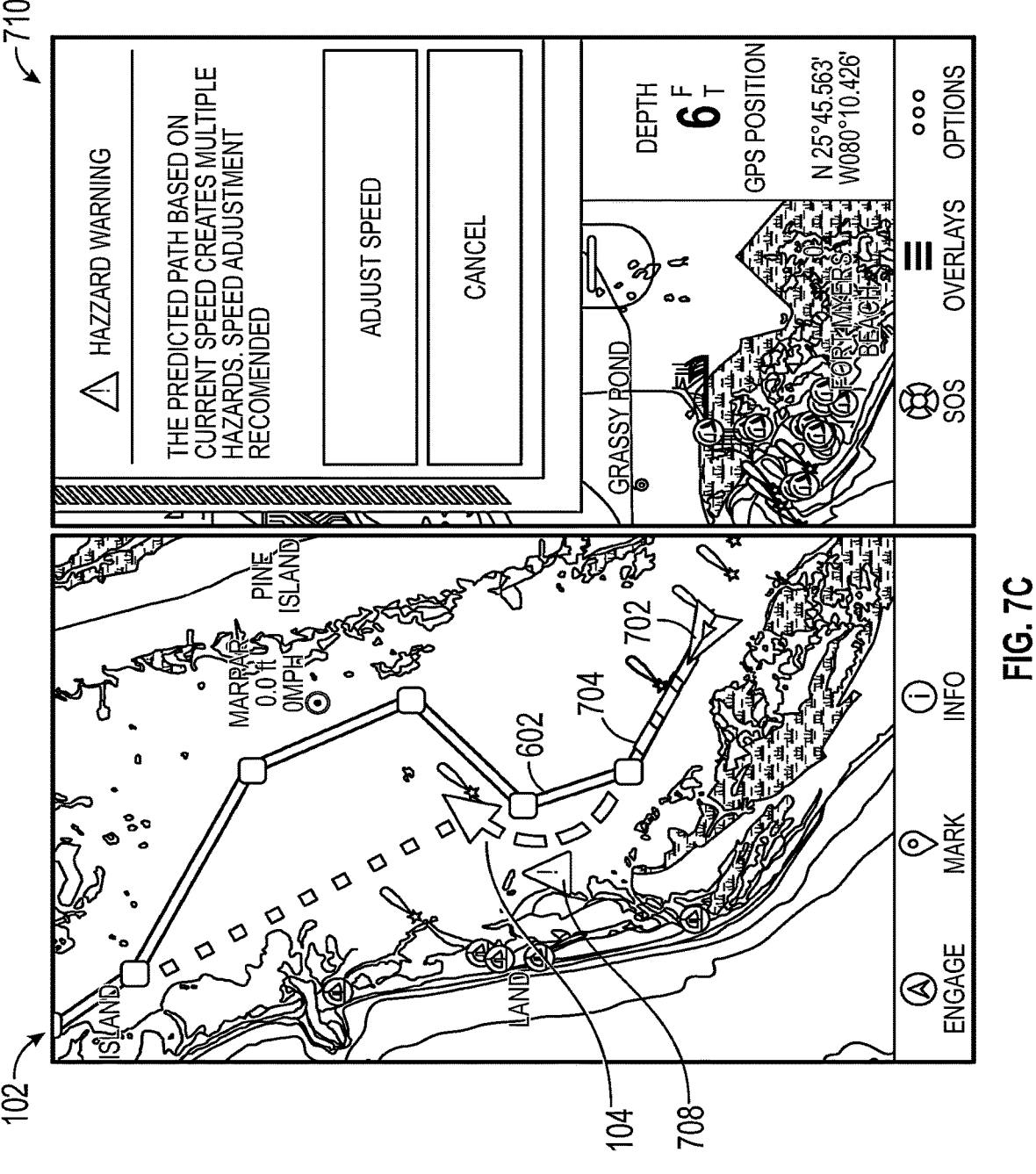

FIGS. 7A-7C depict control trajectories for vessel 104 based on the velocity of vessel 104. As described above, marine autopilot system 200 may provide path planning to provide guidance trajectories for enhanced situational awareness. The guidance may be based on charts, community data (AIS), current boat speed, speed zones, hazards, and moving targets. As depicted in FIG. 7A, path 602 is planned by planning system 240 prior to navigation by vessel 104 and after receiving a destination location. Path 602 may be planned from a starting position 702 to the destination (not shown). Local trajectory 704 may be determined in real time by following path 602 and including the current marine environment data that includes community data, vessel speed, speed zones, detected hazards, and detected moving targets, which may also be described herein as hazards or objects. FIG. 7A depicts precise path following where local trajectory 704 calculation is along path 602 and the vessel 104 follows the trajectory precisely. Here, the speed of vessel 104 is adapted such that each turn may be completed with vessel 104 staying within a threshold distance error of the path 602 as projected along the local trajectory 704 as calculated. As described above, the speed of vessel 104 may be reduced based on the angle of the turn such that vessel 104 is able to maneuver the turn while staying close to the planned path.

FIG. 7B depicts an exemplary trajectory of vessel 104 overshooting a turn because the speed of vessel 104 is too great. In this situation, the speed may be controlled by the user while the navigation is controlled by marine autopilot system 200. As such, the user may control the speed to be faster than required by vessel 104 to make the turn and remain on path 602. Marine autopilot system 200 may provide a warning to the user to reduce the speed and provide a maximum speed or a range of speeds necessary to remain within a distance of path 602. When the speed is too great, a slight overshoot and subsequent path correction by marine autopilot system 200 may result.

FIG. 7C depicts a scenario where the speed is too great entering the designated turn and hazard 708 follows when vessel 104 overshoots the turn. Hazard avoidance may override the user controls and the path following as shown. When the hazard becomes a red target, as described above, marine autopilot system 200 may take over and reduce the speed and turn vessel 104 away from hazard 708. As such, marine autopilot system 200 may avoid hazard 708 without input from the user. When hazard 708 is clear, either the user may navigate back to path 602 or marine autopilot may plot a trajectory to rejoin path 602 considering any additional hazards.

Furthermore, as illustrated in FIG. 7C, hazard warning 710 may be displayed to the user and audible and visual alerts may notify the user of hazard warning 710. Hazard warning 710 may recommend that the user adjust the speed based on hazard 708 or may notify the user that marine autopilot system 200 is taking full or partial control to avoid hazard 708. Hazard warning 710 may provide information related to hazard 708 such as classification, speed, and direction and the like. In some embodiments, hazard warning 710 may also be automatically displayed to the other vessel and instructions may be provided to the other vessel. In some embodiments, marine autopilot system 200 may sound an alarm such that users of the other vessel may be alerted to the hazard.

Figure 8:
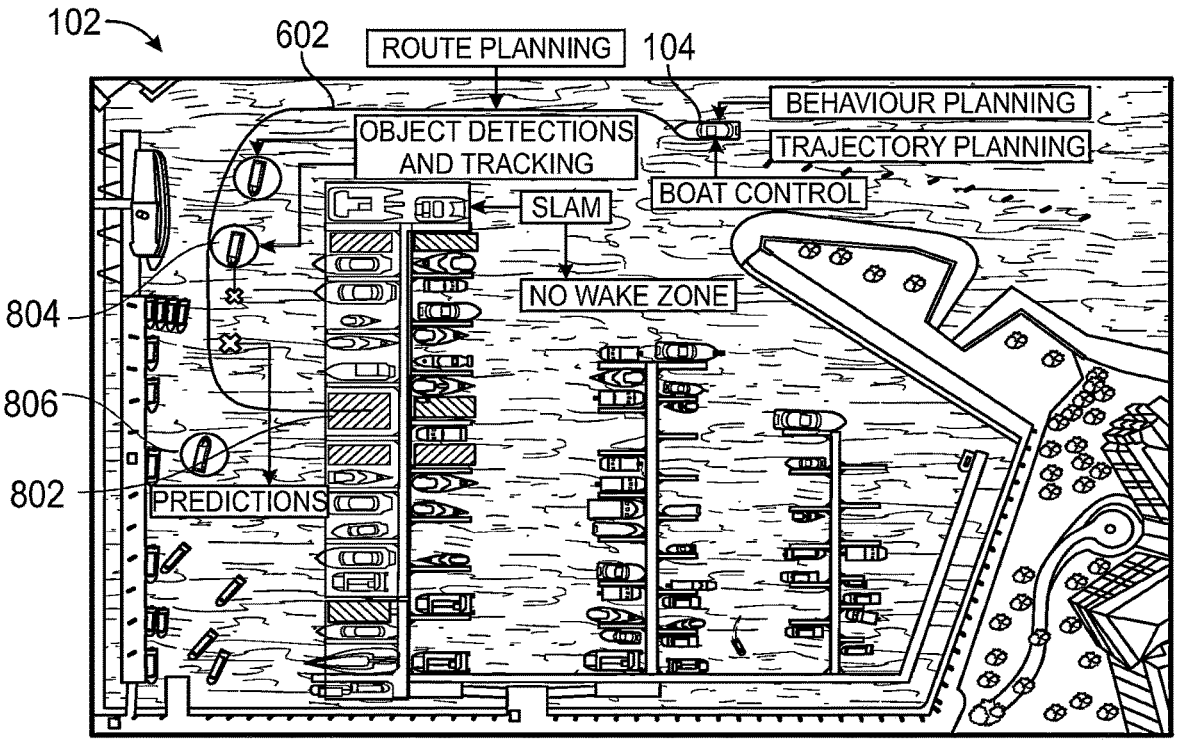
FIG. 8 depicts exemplary destination location and docking.

FIG. 8 depicts one example of a marine environment 102, which is a destination environment (e.g., marina). Typical destination environments comprise many hazards, such as, breakers, piers, docks, other vessels, speed limits, and the like in close quarters. Sensors 202 may be utilized to obtain data indicative of the destination environment and path 602 as planned to an open dock or a known owned dock of the user. As described above, the marine autopilot system may utilize all sensors 202 to detect hazards and control vessel 104 along path 602 while avoiding the hazards utilizing collision avoidance algorithms described above. Detected hazard information may include, for instance, the location, orientation, attitude, type, and duration of a hazard.

In some embodiments, predictions may be made based on a current state of marine environment 102 as detected by sensors 202. Other vessels may be detected and tracked, and future locations of the other vessels may be predicted based on time changes. For example, time for vessel 104 to arrive at dock 802 based on path 602 may be two minutes. First other vessel 804 may be currently in line with path 602; however, it is expected, based on the movement and direction of first other vessel 804, that first other vessel 804 will not be in line with path 602 in 1.5 minutes when vessel 104 reaches that point along path 602. Therefore, first other vessel 804 may not be determined to be a hazard. Furthermore, second other vessel 806 may currently be located past dock 802 but may be moving to exit the marina placing second other vessel 806 in line with path 602. Therefore, though second other vessel 806 is not currently in line with path 602, second other vessel 806 is predicted to be in line with path 602 when vessel 104 is there. Accordingly, second other vessel 806 may be designated as a hazard, and marine autopilot system 200 may implement collision avoidance to move past second other vessel 806. In some embodiments, this entire scenario may be implemented in SLAM as described in embodiments above.

In some embodiments, a detailed map of dock 802 may be generated using sensors 202. Specifically, LIDAR system 208 may be used to generate an accurate 3D map of dock 802 and a continual distance between vessel 104 and dock 802 may be tracked. In a marina, LIDAR system 208 could detect the objects. Furthermore, outside of the marina any typical radar can be used. In the marina radar may be restricted and typical marine radar and also, multi wave radar, or radar with 77 GHz can be used inside marina. Marine autopilot system 200 may use the dock mapping data to slowly propel vessel 104 into dock 802 and stop when vessel 104 is next to a side of dock 802 such that the user may tie down vessel 104. In some embodiments, marine autopilot system 200 may use LIDAR to determine an accurate location of a boat trailer and align vessel 104 with a boat trailer and propel vessel 104 onto the boat trailer for attachment by the user.

In some embodiments, the docking location may not be known. For example, a user may be getting gas at a shoreside gas station or may be docking at a shoreside restaurant. The user may display the shoreline along with other vessels docked along the shoreline and tap a location on display device 122 in which to dock vessel 104. A 4D map may be generated of the docking location using LIDAR system 208 as well as any of a variety of other types of sensors 202 and marine autopilot system 200 may slowly dock vessel 104 at the desired location. The 4D map may be a 3D map that continuously updates with distance measurements from LIDAR system 208 providing the most up-to-date data available.

Figure 9:
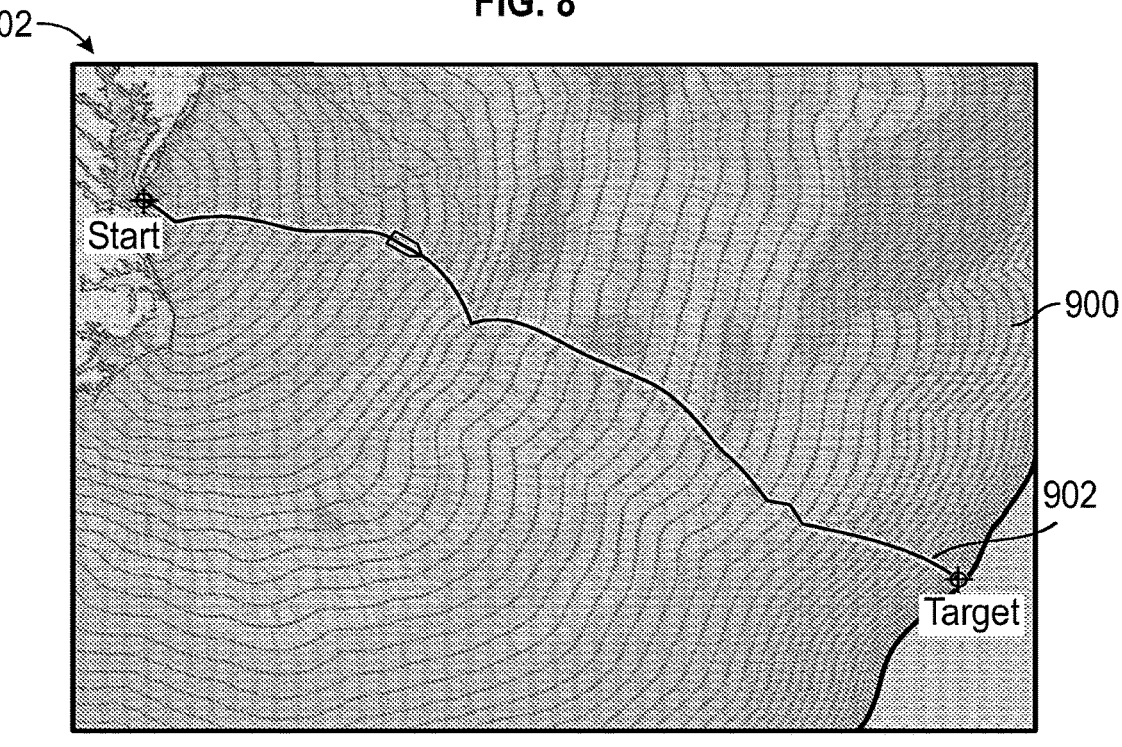
FIG. 9 depicts an exemplary weather path through a weather pattern.

FIG. 9 depicts one example of a weather system 900 and vessel route 902 through the weather system 900. In some embodiments, vessel 104 is a motorized boat and marine autopilot system 200 may compensate for the environmental conditions by angling the bow of the boat into currents or wind to compensate for crosswind and crosscurrent. Furthermore, one or more motors 106 may be adjusted to compensate for the crosswind and crosscurrent. In some embodiments, a controller may be used to compensate for the estimated crosswind and crosscurrent based on historical data, current readings, and physical models of the wind and current. The controller may be a machine learning algorithm, linear or nonlinear, or adaptive controller. Accordingly, robust control may be implemented for severe conditions such that a loose direction and speed may guide vessel 104 to shore when the conditions become extremely rough.

In some embodiments, marine autopilot system 200 may control vessel 104 to compensate for the weather conditions when vessel 104 is a sailboat. In some embodiments, marine autopilot system 200 provides end to end navigation and control for sailboats based on wind patterns. In some embodiments, weather data may be received in GRIB format and processed by marine autopilot system 200 to plan a path through the weather systems. Marine autopilot system 200 may determine optimal routes based on distance and time minimization based on tack/jibes movement and comfort of the user. The weather and wind direction may be tracked, and optimal tack/jibes changes may be displayed and/or notifications may be sent to the user directing the user when to change. In some embodiments, sail assist may automatically adjust sail control at the optimal times by controlling electromechanical actuators to control the sail.

In some embodiments, if the weather is hazardous or sailing is simply inefficient based on the weather, marine autopilot system 200 may automatically switch between various modes such as sailing and motorized propulsion. Marine autopilot system 200 may optimize routes based on sailing and motorized propulsion and switch seamlessly between each mode based on user input or sail and/or motor detection.

Figure 10:
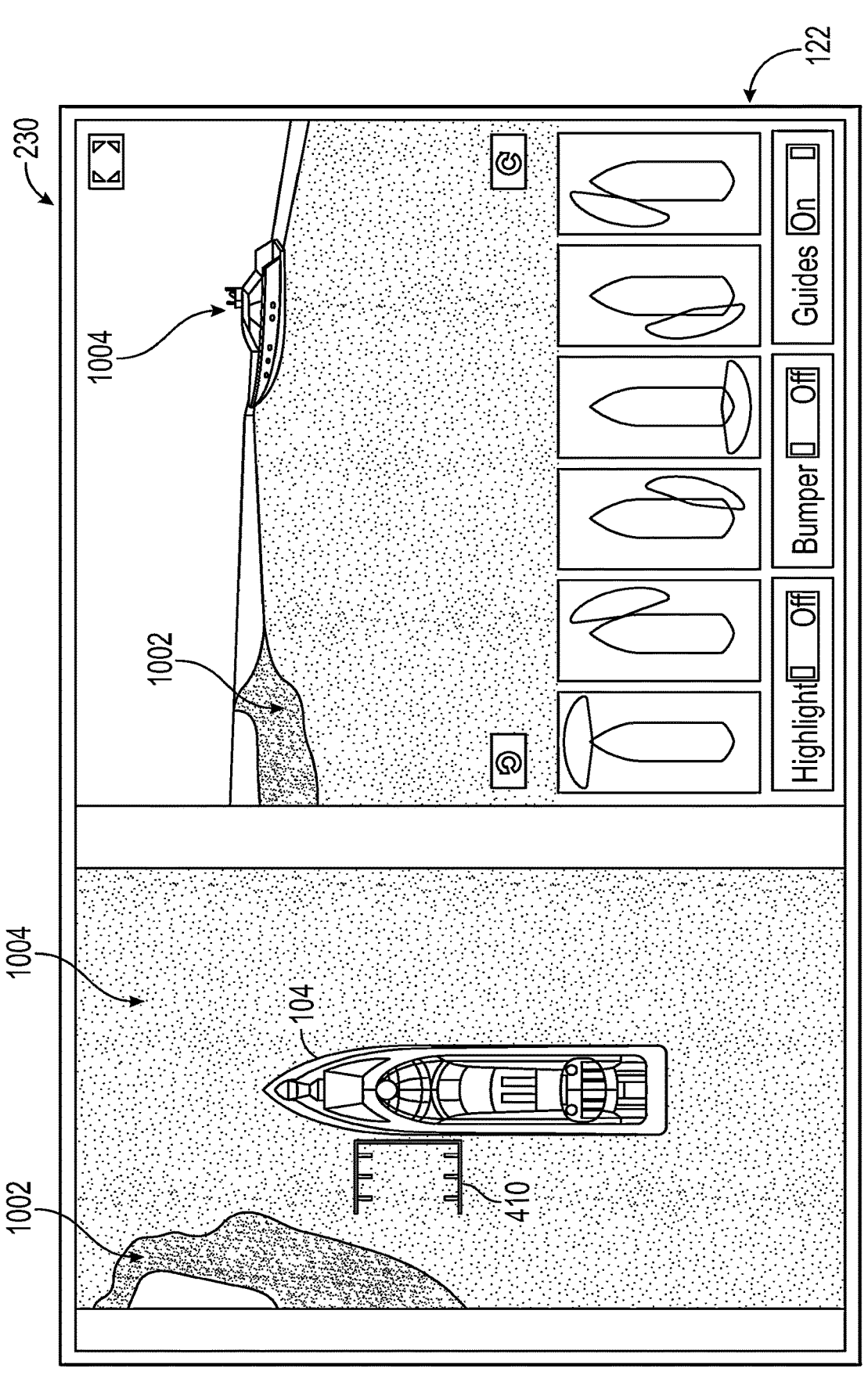
FIG. 10 depicts an exemplary user interface.

FIG. 10 depicts one example of a user interface 124 for interaction with marine autopilot system 200. It will be understood that various implementations of the marine autopilot system 200 may provide any one or more of the features described herein. In various implementations, the user may selectively enable and/or disable one or more of the features, the marine autopilot system 200 may automatically enable and/or disable one or more of the features under relevant circumstances, and one or more of the features may be simultaneously employable. For example, the object identification feature and the distance markers 410 may be simultaneously employed as shown in FIG. 10. For another example, the virtual boundary feature 82 and/or the collision prediction feature and the automatic camera selection feature may be simultaneously employed.

User interface 124 enables the user to interact with marine autopilot system 200 based on information provided by the features described herein. For example, the user may select object 1002 on display device 122 to mark as a waypoint (and/or obstacle) for future navigational reference. Marine autopilot system 200 may utilize these stored locations, and/or other cartographic locations stored within the memory of marine autopilot system 200, to automatically transition camera views as the vessel approaches known objects. The user may likewise select displayed objects for tracking and monitoring by marine autopilot system 200 regardless of the particular camera view selected by the user (e.g., ship 1004). Additionally, or alternatively, the user may utilize the user interface 124 to select locations for automatic docking and navigation. For instance, a user may touch a desired location on a displayed image from one or more of the cameras, marine autopilot system 200 may determine the geographic location corresponding to the desired location, and marine autopilot system 200 may automatically navigate to the desired location using autopilot features and the detected object information. As one example, the user may select object 1002, which is the shoreline. The shoreline may be detected and classified, and GPS coordinates may be stored. Marine autopilot system 200 may navigate at a safe distance from the shoreline or may approach the shoreline and maintain a location a specified distance from the location that the user indicated. Furthermore, as described above, the user may touch various objects such as the shoreline and the water and the various objects may be displayed as different shades or different colors as simple visual cues for the user. The user interface 124 may present a plurality of trajectories for review and selection by the user. The presented information may include, for example, recommended changes in speed, direction, or operation of the vessel based on the location, orientation, speed, or other information associated with a hazard.

Figure 11:
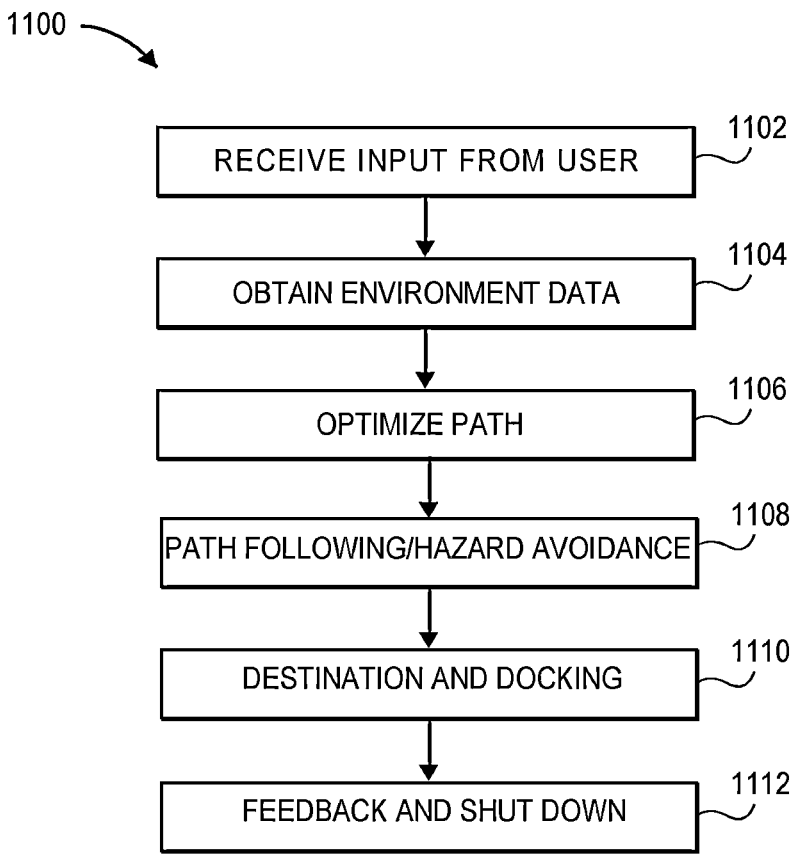
FIG. 11 depicts operations implemented by a marine autopilot system to navigate the marine environment.

FIG. 11 depicts an exemplary flow chart 1100 illustrating operations for controlling a vessel through marine environment 102. At step 1102, marine autopilot system 200 may receive input from the user as described in embodiments above. The user may enter a destination and an optimization rule to calculate a path from the current location (or a starting point) to the destination location. The user may input the information by user interface 124 as part of interface 230.

At step 1104, marine autopilot system 200 may obtain data to optimize a route and generate a path through marine environment 102 as described in embodiments above. The marine environment data may be obtained from marine chart data, maps, satellite imagery, AIS, and the like. A virtual map of marine environment 102 may be generated such that an optimal route, based on the dynamic model of vessel 104 and an optimization rule, may be determined.

At step 1106, the dynamic model of vessel 104 along with an optimization rule may be used to calculate a route and generate path 602 through marine environment 102 as described in embodiments above. The optimization rule may be based on user comfort, speed, efficiency, sightseeing, or the like. The route may be determined and path 602 may be generated and displayed on display device 122 by marine autopilot system 200. In some embodiments, SLAM may be utilized to generate a virtual marine environment for prediction and simulation of marine environment 102. When predictions for the changing environment are made, and marine environment 102 is simulated, path 602 may be generated in the virtual environment to predict the behavior of vessel 104 in marine environment 102.

At step 1108, marine autopilot may control vessel 104 along path 602 as described in embodiments above. Marine autopilot system 200 may control vessel 104 to follow path 602 minimizing the error between path 602 and the trajectory of vessel 104. As such, vessel 104 may precisely follow path 602. Furthermore, sensors 202 may be used to detect hazards along path 602 and object avoidance algorithms may be used to change the trajectory of vessel 104 to avoid the hazards at step 1110. Boundaries may be virtual added to vessel 104 and hazards such that the boundaries may interact or overlap when vessel 104 and the hazards become too close. As a result of the overlapping boundaries, marine autopilot system 200 may avoid the hazards.

At step 1110, marine autopilot system 200 may enter destination and docking mode to dock vessel 104 as described in embodiments above. Marine autopilot system 200 may navigate a marine comprising many hazards in close quarters while docking vessel 104 in a specific location. Marine autopilot system 200 may control vessel 104 to reduce speed in the close quarters of a marina, and radar system 206 may be shut down or switched to marina-usable radar only. LIDAR system 208 may be utilized to obtain detailed images and locations of dock 802 for docking. Based on the detailed information provided by sensors 202, marine autopilot system 200 may dock vessel 104 completely autonomously.

At step 1112, marine autopilot system 200 may shut down vessel 104, store data associated with the trip, and request feedback from the user. The user may provide feedback based on their experience during the trip. This feedback may be used to provide a more user-friendly experience in the future. For example, the user may provide feedback on the comfort level of the trip. A stored comfort level assigned to the user may be updated based on the user feedback.

As described above, all features described herein may be customizable by the user. The user may define when boundaries are displayed, colors of hazards, highlighted hazards, path display color, vessel icon and display, and the like. Any features of marine autopilot system 200 may be turned on or off and the user may operate marine autopilot system 200 in manual, autonomous, or hybrid modes, as described above.

Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. A marine autopilot system for controlling a marine vessel through a marine environment, the marine autopilot system comprising:

at least one storage device storing historic data indicative of the marine environment and computer-executable instructions;

one or more sensors for obtaining current data indicative of the marine environment and a state of the marine vessel; and at least one processor configured to execute the computer-executable instructions to:

obtain a destination location;

calculate a path between a first location of the marine vessel and the destination location;

control the marine vessel along the path;

obtain the current data indicative of the marine environment by the one or more sensors, wherein the current data comprises a location of a hazard;

generate a classification of the hazard based at least in part on a geometry and sound of the hazard;

update a trajectory of the marine vessel based on the location of the hazard, wherein the updated trajectory is based at least in part on the classification of the hazard, and wherein the updated trajectory avoids the location of the hazard and returns the marine vessel to the path; and control the marine vessel along the trajectory.

2. The marine autopilot system of claim 1, wherein the current data comprises data indicative of objects in the marine environment detected by the one or more sensors on the marine vessel.

3. The marine autopilot system of claim 2, wherein the one or more sensors comprise an optical camera, sonar, LIDAR, and an anemometer.

4. The marine autopilot system of claim 1, wherein the current data comprises data indicative of a marine vessel location, a velocity, and an orientation of the marine vessel.

5. The marine autopilot system of claim 1, wherein the computer-executable instructions are further executed to:

generate a virtual boundary around the marine vessel; and control the marine vessel to avoid the hazard when the hazard crosses the virtual boundary.

6. The marine autopilot system of claim 1, wherein the computer-executable instructions are further executed to:

generate a virtual boundary around the marine vessel;

generate a hazard virtual boundary around the hazard; and control the marine vessel to avoid the hazard when the hazard virtual boundary crosses the virtual boundary.

7. The marine autopilot system of claim 1, wherein the current data comprises a wind direction; and wherein the computer-executable instructions are further executed to control one of a sail or a rudder of a sailboat based on the wind direction.

8. The marine autopilot system of claim 1, wherein the computer-executable instructions are further executed to:

obtain dock data of a dock by LIDAR; and control the marine vessel into the dock based on the dock data.

9. A marine autopilot system for controlling a marine vessel through a marine environment, the marine autopilot system comprising:

a display;

at least one storage device storing historic data indicative of the marine environment and computer-executable instructions;

one or more sensors for obtaining current data indicative of the marine environment and a state of the marine vessel; and at least one processor configured to execute the computer-executable instructions to:

obtain a destination location;

calculate a path between a first location of the marine vessel and the destination location;

control the marine vessel along the path;

obtain the current data indicative of the marine environment by the one or more sensors, wherein the current data comprises a location of a hazard, generate a classification of the hazard based at least in part on a geometry and sound of the hazard; and update a trajectory of the marine vessel by controlling speed and direction of the marine vessel based on stored dynamics of the marine vessel and the location of the hazard, the updated trajectory avoiding the location of the hazard and returning the marine vessel to the path, wherein the updated trajectory and path are presented on the display, and wherein the updated trajectory is based at least in part on the classification of the hazard.

10. The marine autopilot system of claim 9, wherein the one or more sensors comprise an optical camera, sonar, LIDAR, and an anemometer, and wherein the current data comprises data indicative of a marine vessel location, a velocity, and an orientation of the marine vessel.

11. The marine autopilot system of claim 9, wherein the computer-executable instructions are further executed to:

generate a virtual boundary around the marine vessel; and control the marine vessel to avoid the hazard when the hazard crosses the virtual boundary.

12. The marine autopilot system of claim 9, wherein the computer-executable instructions are further executed to:

generate a virtual boundary around the marine vessel;

generate a hazard virtual boundary around the hazard, wherein the hazard virtual boundary is based on the classification of the hazard; and control the marine vessel to avoid the hazard when the hazard virtual boundary crosses the virtual boundary.

* * * * *